(12) United States Patent
Drury et al.

(10) Patent No.: US 9,132,388 B2
(45) Date of Patent: Sep. 15, 2015

(54) PARTITION FLUID SEPARATION

(71) Applicant: CORNING INCORPORATED, Corning, NY (US)

(72) Inventors: Kenneth Joseph Drury, Big Flats, NY (US); Darryl L Dunning, Elmira, NY (US); Paul Oakley Johnson, Corning, NY (US); Robert Lucchesi, Flemington, NJ (US); Randall D Partridge, Califon, NJ (US); Brandon Thomas Sternquist, Corning, NY (US)

(73) Assignee: Corning Incorporated, Corning, NY (US)

( * ) Notice: Subject to any disclaimer, the term of this patent is extended or adjusted under 35 U.S.C. 154(b) by 247 days.

(21) Appl. No.: 13/686,208

(22) Filed: Nov. 27, 2012

(65) Prior Publication Data
US 2013/0133249 A1    May 30, 2013

Related U.S. Application Data

(60) Provisional application No. 61/563,860, filed on Nov. 28, 2011.

(51) Int. Cl.
*B01D 61/36* (2006.01)
*B01D 63/06* (2006.01)
(Continued)

(52) U.S. Cl.
CPC ............ *B01D 61/366* (2013.01); *B01D 63/066* (2013.01); *B01D 71/80* (2013.01);
(Continued)

(58) Field of Classification Search
CPC .. B01D 63/066; B01D 61/362; B01D 61/366; B01D 71/60; B01D 2313/10; B01D 2313/21; B01D 71/52; B01D 71/80; F02M 27/00
See application file for complete search history.

(56) References Cited

U.S. PATENT DOCUMENTS 3,172,251 A    3/1965    Johnson
4,452,612 A *  6/1984    Mattia ............................ 95/100
(Continued)

FOREIGN PATENT DOCUMENTS

CA    2761080    11/2010
CN    101960124    1/2011
(Continued)

OTHER PUBLICATIONS

CN101960124—machine translation.
(Continued)

*Primary Examiner* — John Kim
(74) *Attorney, Agent, or Firm* — Susan S. Wilks; Brian M. Bonner

(57) ABSTRACT

A pervaporation element includes a ceramic monolith having an array of parallel channels separated by porous channel walls extending along an axial length of the monolith, and a functional membrane coating a first plurality of the porous channel walls along the axial length of the monolith. The functional membrane functions to separate a fluid into a retentate portion and a permeate portion. The porous channel walls coated by the functional membrane define a plurality of discrete through segments, where each of the discrete through segments are separated from one another by a plurality of uncoated porous channel walls. Fluid entering the discrete through segments is separated into a retentate portion that exits in substantial portion through the discrete through segments and a permeate portion that exits the ceramic monolith radially outward through the uncoated porous channel walls and through a skin of the monolith.

18 Claims, 11 Drawing Sheets

(51) Int. Cl.
  *B01D 71/80* (2006.01)
  *B01D 71/52* (2006.01)
  *B01D 71/60* (2006.01)
  *F02M 27/00* (2006.01)

(52) U.S. Cl.
  CPC .............. *B01D 61/362* (2013.01); *B01D 71/52* (2013.01); *B01D 71/60* (2013.01); *B01D 2313/10* (2013.01); *B01D 2313/21* (2013.01); *F02M 27/00* (2013.01)

(56) References Cited

U.S. PATENT DOCUMENTS

| | | | |
|---|---|---|---|
| 4,509,466 A | 4/1985 | Bernardoni et al. | |
| 4,814,087 A | 3/1989 | Taylor | |
| 5,062,910 A | 11/1991 | Garcera et al. | |
| 5,482,625 A | 1/1996 | Shimizu et al. | |
| 5,766,468 A | 6/1998 | Brown et al. | |
| 5,888,384 A | 3/1999 | Wiederhold et al. | |
| 6,126,833 A | 10/2000 | Stobbe et al. | |
| 6,258,144 B1 | 7/2001 | Huang | |
| 6,711,893 B2 | 3/2004 | Ueda et al. | |
| 6,780,227 B2 | 8/2004 | DuBose | |
| 6,803,015 B2 | 10/2004 | Vance | |
| 6,972,093 B2 | 12/2005 | Partridge | |
| 7,013,844 B2 | 3/2006 | Oda | |
| 7,423,192 B2 | 9/2008 | Sabottke et al. | |
| 7,523,724 B2 | 4/2009 | Duraiswamy et al. | |
| 7,594,498 B2 | 9/2009 | Lewis et al. | |
| 7,803,275 B2 | 9/2010 | Partridge | |
| 7,842,124 B2 | 11/2010 | Partridge | |
| 7,927,486 B2 | 4/2011 | Shah | |
| 7,971,572 B2 | 7/2011 | Cohn et al. | |
| 8,147,699 B2 | 4/2012 | Goldsmith | |
| 8,240,332 B1 | 8/2012 | Matusek et al. | |
| 8,465,648 B2 * | 6/2013 | Teranishi et al. | 210/640 |
| 2002/0139321 A1 | 10/2002 | Weissman et al. | |
| 2004/0256321 A1 | 12/2004 | Goldsmith | |
| 2005/0103285 A1 | 5/2005 | Oda | |
| 2006/0090649 A1 | 5/2006 | Liu et al. | |
| 2008/0006333 A1 | 1/2008 | Partridge et al. | |
| 2008/0296217 A1 | 12/2008 | Thoraval | |
| 2009/0159057 A1 | 6/2009 | Pursifull et al. | |
| 2010/0037860 A1 | 2/2010 | Morita et al. | |
| 2010/0059441 A1 | 3/2010 | Pattil et al. | 210/500 |
| 2010/0108602 A1 | 5/2010 | Schucker | |
| 2010/0312459 A1 | 12/2010 | Utsumi | |
| 2011/0300335 A1 * | 12/2011 | Clinton et al. | 428/141 |
| 2012/0192834 A1 | 8/2012 | Tonery | |
| 2012/0273502 A1 | 11/2012 | Merchant | |

FOREIGN PATENT DOCUMENTS

| | | |
|---|---|---|
| DE | 102004056746 A1 | 7/2005 |
| EP | 1057988 A2 | 6/2000 |
| EP | 1443202 | 8/2004 |
| EP | 1171224 | 10/2005 |
| EP | 1373698 B1 | 11/2005 |
| EP | 1998031 A1 | 3/2008 |
| EP | 2228113 A1 | 9/2010 |
| WO | WO0277436 A1 | 3/2002 |
| WO | WO02077429 A1 | 10/2002 |
| WO | WO2005049181 A1 | 6/2005 |
| WO | WO2009085260 | 7/2009 |
| WO | WO2009085261 A1 | 7/2009 |
| WO | 2009134359 | 11/2009 |
| WO | 2010099387 | 9/2010 |
| WO | 2011038059 | 3/2011 |
| WO | WO2013003071 A1 | 1/2013 |

OTHER PUBLICATIONS

EP2228113 Description Machine Translation, Aug. 8, 2010.

* cited by examiner

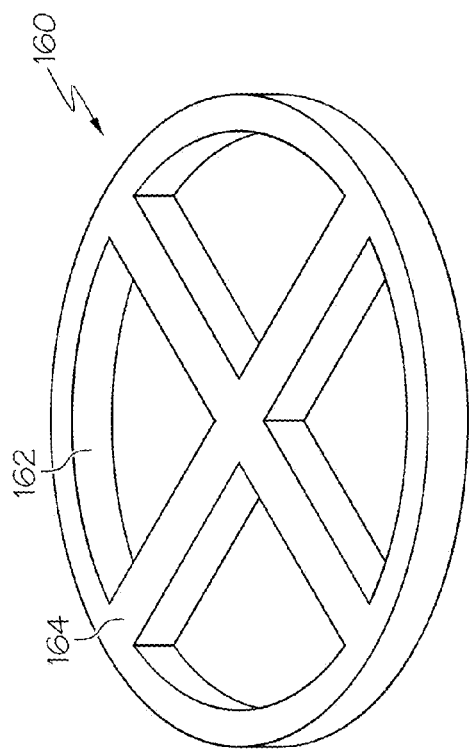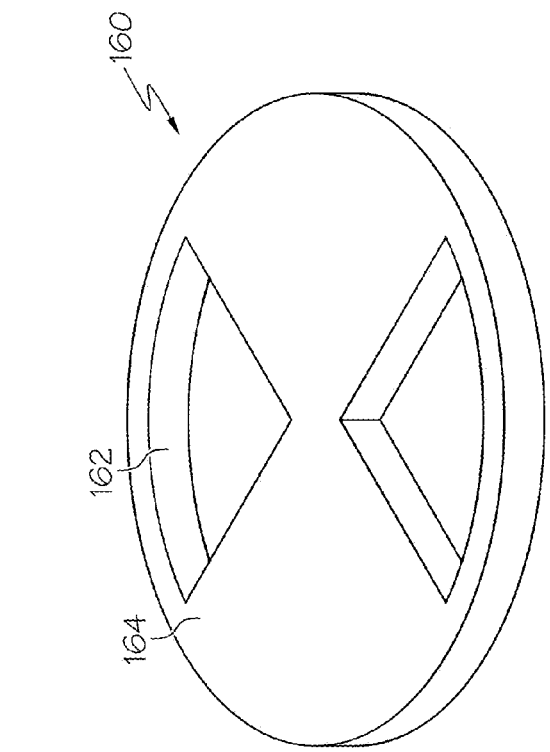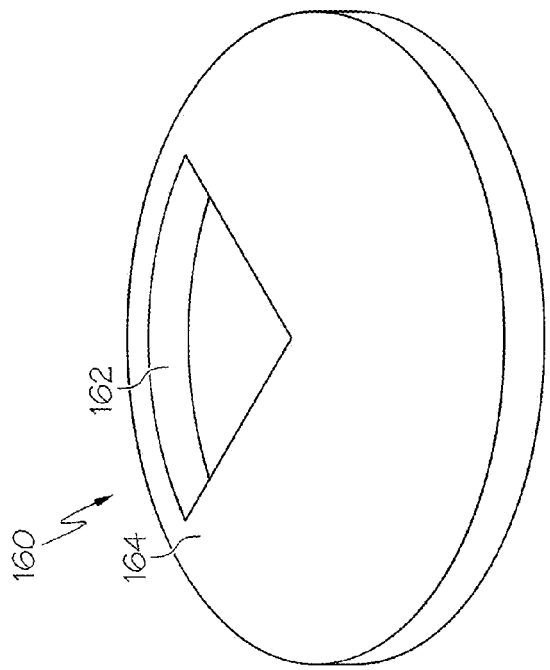

PARTITION FLUID SEPARATION

This application claims the benefit of priority under 35 USC §119 of U.S. Provisional Application Ser. No. 61/563,860 filed Nov. 28, 2011 the content of which is relied upon and incorporated herein by reference in its entirety.

FIELD

The present specification generally relates to partitioned ceramic monoliths and, more specifically, to partitioned ceramic monoliths for separating fluids into constituent components.

TECHNICAL BACKGROUND

In general, gasoline-fueled internal combustion engines initiate a spark during the compression stroke to ignite vaporized gasoline in the combustion chamber. At some operating conditions, some internal combustion engines may have reduced power output due to a requirement to retard spark timing during the compression stroke to avoid pre-ignition of the fuel leading to engine knock. To advance spark timing, fuel with a higher knock resistance, denoted by a higher Research Octane Number (RON), may be used. However, fuel with a higher RON is generally more expensive to purchase than fuel with a lower RON. The availability of the high RON fuel may also be limited by market conditions.

A fuel separation device, such as described in U.S. Pat. No. 7,107,942, separates a flow of fuel into streams having a high RON component and a low RON component by passing the combined fuel stream by a fuel separation membrane. However, such fuel separation devices may be prone to degradation of performance of separation of the high RON portion and the low RON portion of the fuel and may be costly.

Accordingly, a need exists for cost effective partitioned ceramic monoliths with improved performance for use in the separation of fluid components.

SUMMARY

According to various embodiments, a pervaporation element includes a ceramic monolith having an array of parallel channels separated by porous channel walls extending along an axial length of the monolith, and a functional membrane coating a first plurality of the porous channel walls along the axial length of the monolith. The functional membrane functions to separate a fluid into a retentate portion and a permeate portion. The porous channel walls coated by the functional membrane define a plurality of discrete through segments, where each of the discrete through segments is separated from one another by a plurality of uncoated porous channel walls. Fluid entering the discrete through segments is separated into a retentate portion that exits in substantial portion through the discrete through segments and a permeate portion that exits the ceramic monolith radially outward through the uncoated porous channel walls, the porous monolith body, and through a skin of the monolith.

According to further embodiments, an onboard fuel separator includes a pervaporation element, a fuel heater, and a fuel cooler. The pervaporation element includes a ceramic monolith having an array of parallel channels separated by porous channel walls running along a monolith length and a polymeric membrane coating a plurality of the porous channel walls along the monolith length. The polymeric membrane of the pervaporation element defines a plurality of discrete through segments comprised of a plurality of coated porous channel walls. Each of the discrete through segments of the pervaporation element is separated from one another by uncoated porous channel walls.

According to still further embodiments, ceramic monolith for a pervaporation element includes an array of parallel channels separated by porous channel walls extending along an axial length of the monolith. The ceramic monolith further includes a functional membrane coating a first plurality of the porous channel walls along the axial length of the monolith, the functional membrane functioning to separate a fluid into a retentate portion and a permeate portion. The porous channel walls coated by the functional membrane define a plurality of discrete through segments, where each of the discrete through segments are separated from one another by a plurality of uncoated porous channel walls. Fluid entering the discrete through segments is separated into a retentate portion that exits in substantial portion through the discrete through segments and a permeate portion that exits the ceramic monolith radially outward through the uncoated porous channel walls and through a skin of the monolith.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 6 graphically depicts a perspective view of a face seal according to one or more embodiments shown and described herein;

FIG. 7A graphically depicts a perspective view of a face seal according to one or more embodiments shown and described herein;

FIG. 7B graphically depicts a perspective view of a face seal according to one or more embodiments shown and described herein;

DETAILED DESCRIPTION

Figure 1:
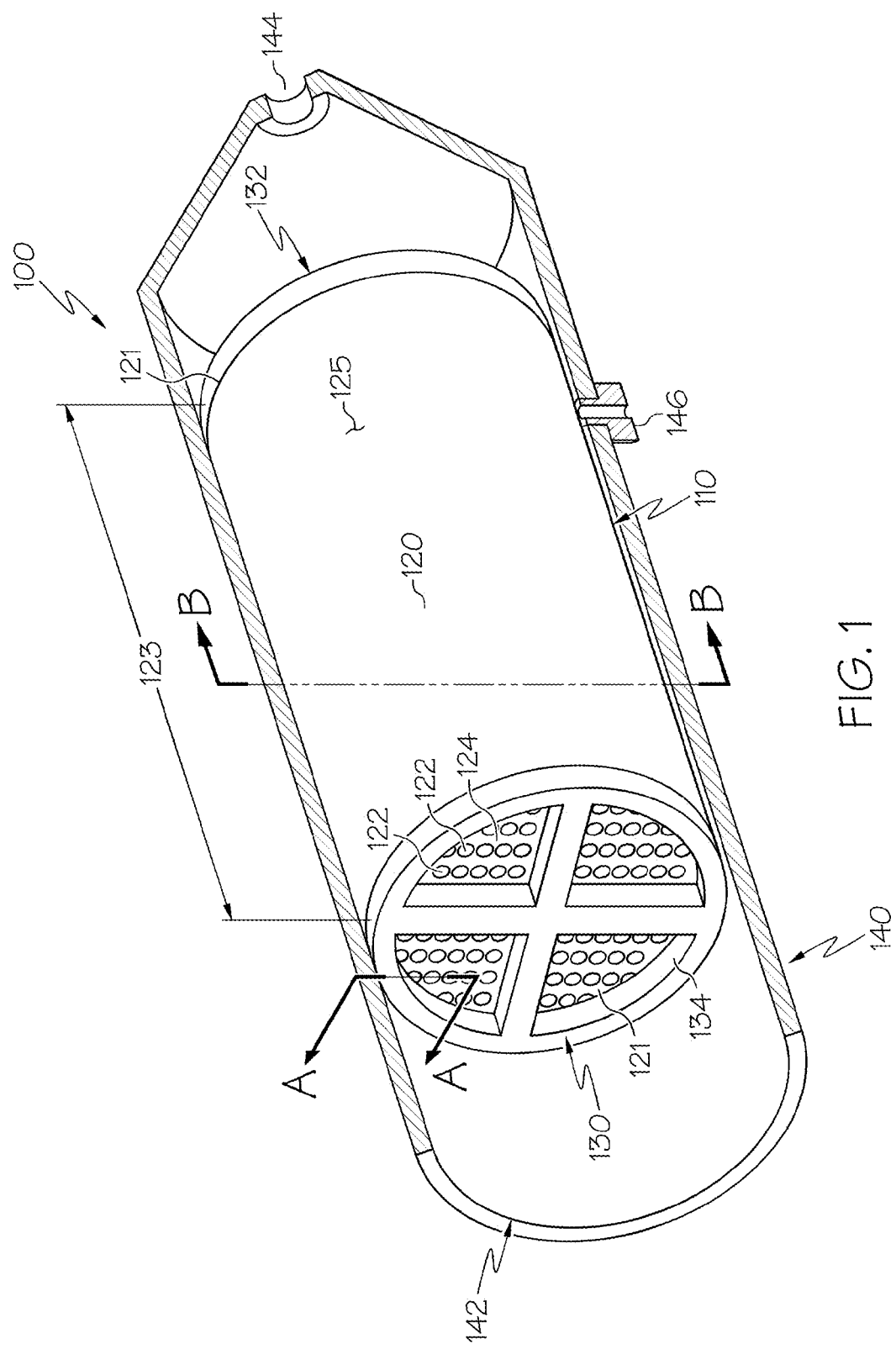
FIG. 1 graphically depicts a cut-away view of a pervaporation element having a partitioned ceramic monolith according to one or more embodiments shown and described herein.

Referring now to FIG. 1, a pervaporation element incorporating a partitioned ceramic monolith is schematically depicted according to one or more embodiments shown and described herein. The ceramic monolith is a honeycomb-like structure comprising a plurality of parallel channels separated by porous channel walls. A plurality of the porous channel walls are coated with a functional membrane along an axial length of the monolith. To define discrete through segments of the monolith, the functional membrane separates fluid flowing through the monolith into a retentate portion and a permeate portion. Each of the discrete through segments is separated from one another by a plurality of uncoated porous channel walls. Fluid introduced into one of the discrete through segments is separated into a retentate portion that flows along the discrete through segments and a permeate portion that flows through the coated and uncoated porous channel walls. The particular pervaporation element and methods of making the pervaporation element will be described in more detail herein.

The term "pervaporation" refers to the ability of the targeted fluid to flow through the membrane on the monolith walls. This phenomenon is a solution diffusion process which is characterized by a sorption of the feed components into the membrane (characterized by $S_i$, for solubility of a given component), diffusion through the membrane (characterized by $D_i$, for diffusivity of a given component) and desorption of the component from the backside of the membrane into the body of the monolith. The S and D are different for each species in the feed to the assembly. This provides the Permeability or permeation rate, $P_i$, of a given material as $D_i \times S_i$. Furthermore selectivity, $\alpha_{i/j}$ of a species in ratio to another is given by $P_i/P_j$.

Referring to FIG. 1 in detail, a portion of a pervaporation element 100 is depicted. The pervaporation element 100 includes a monolith assembly 110 including a ceramic monolith 120, an upstream segmented end cap 130, and a downstream segmented end cap 132. The ceramic monolith 120 has an axial length 123 and a characteristic perimeter or skin 125. The upstream segmented end cap 130 and the downstream segmented end cap 132 are arranged along opposite axial ends 121 of the ceramic monolith 120. The monolith assembly 110 is positioned within a housing assembly 140, which is illustrated in cut-away. The housing assembly 140 surrounds the monolith assembly 110 and provides a fluid-tight connection between the fluid inlet port 142, the retentate outlet port 144 and the permeate outlet port 146. As will be discussed below, fluid introduced into the ceramic monolith 120 is separated into two fluid streams. One fluid stream flows axially through a plurality of parallel channels 122 of the ceramic monolith 120 and exits the pervaporation element 100 through the retentate outlet port 144. The other stream flows through a plurality of porous channel walls 124 of the ceramic monolith 120 and exits the pervaporation element 100 through the permeate outlet port 146.

Figure 3:
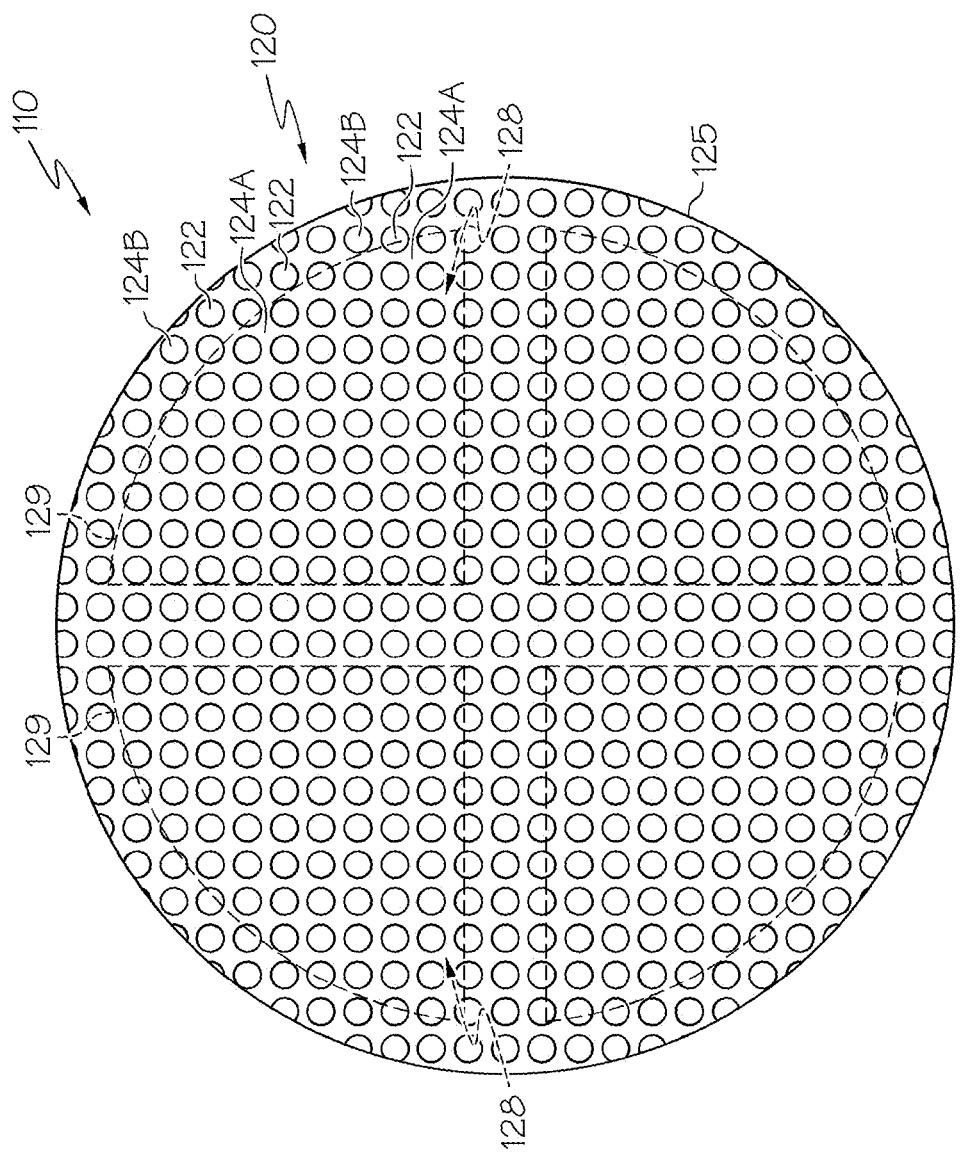
FIG. 3 graphically depicts a partial front sectional view of one embodiment of the pervaporation element having a partitioned ceramic monolith illustrated in FIG. 1 along line B-B.
Figure 4:
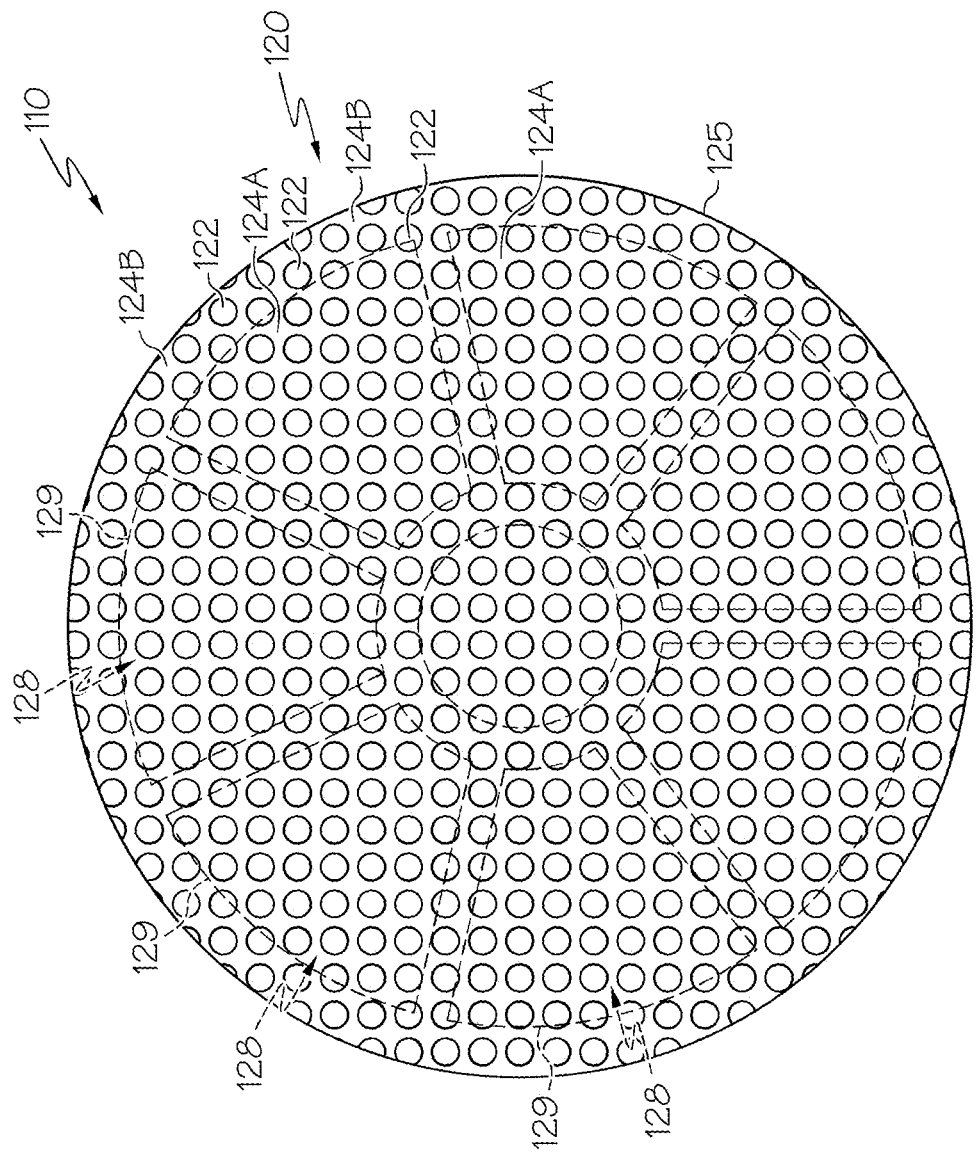
FIG. 4 graphically depicts a partial front sectional view of one embodiment of the pervaporation element having a partitioned ceramic monolith illustrated in FIG. 1 along line B-B.

Referring to FIGS. 1 and 3-4, the plurality of parallel channels 122 are generally circular in cross section. However, in alternative embodiments, the plurality of channels in the article may have other cross-sectional configurations, including rectangular, square, oblong, triangular, octagonal, hexagonal, or combinations thereof.

In the embodiments described herein, the ceramic monolith 120 may be formed with a channel density of up to about 500 channels per square inch (cpsi). For example, in some embodiments, the ceramic monolith 120 may have a channel density in a range from about 70 cpsi to about 400 cpsi. In some other embodiments, the ceramic monolith 120 may have a channel density in a range from about 200 cpsi to about 250 cpsi or even from about 70 cpsi to about 150 cpsi.

In the embodiments described herein, the porous channel walls 124 of the ceramic monolith 120 may have a thickness of greater than about 10 mils (254 microns). For example, in some embodiments, the thickness of the porous channel walls 124 may be in a range from about 10 mils up to about 30 mils (762 microns). In some other embodiments, the thickness of the porous channel walls 124 may be in a range from about 15 mils (381 microns) to about 26 mils (660 microns).

In the embodiments of the pervaporation element 100 described herein the porous channel walls 124 of the ceramic monolith 120 may have a bare open porosity (i.e., the porosity before any coating is applied to the ceramic monolith 120) % P≥35% prior to the application of any coating to the ceramic monolith 120. In some embodiments the bare open porosity of the porous channel walls 124 may be such that 20%≤% P≤60%. In other embodiments, the bare open porosity of the porous channel walls 124 may be such that 25%≤% P≤40%.

In general, ceramic monoliths produced with a mean pore size greater than about 1 microns make it very difficult to produce a viable membrane coating on the substrate. Accordingly, it is generally desirable to maintain the mean pore size of the porous channel walls between about 0.01 microns and about 0.80 microns.

In the embodiments described herein the honeycomb body of the ceramic monolith 120 is formed from a ceramic material such as, for example, cordierite, mullite, silicon carbide, aluminum oxide, aluminum titanate or any other porous material suitable for use in elevated temperature particulate filtration applications.

Figure 2:
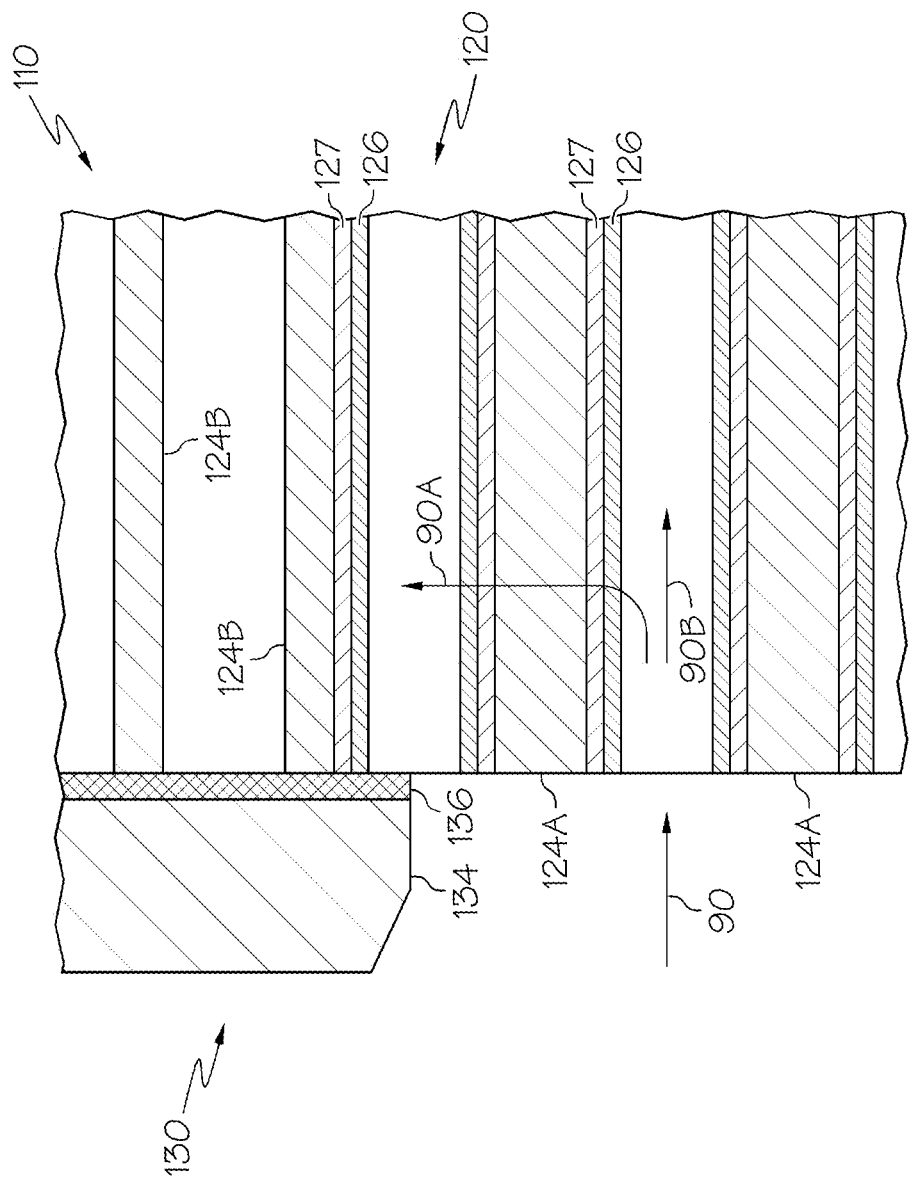
FIG. 2 graphically depicts a partial side sectional view of a pervaporation element having a partitioned ceramic monolith illustrated in FIG. 1 along line A-A.

Referring now to FIGS. 1 and 2, the segmented end caps 130, 132 include a plurality of openings 134 that are positioned to expose a plurality of parallel channels 122 of the ceramic monolith 120, while simultaneously covering and sealing a plurality of other parallel channels of the ceramic monolith 120. The segmented end caps 130, 132 are secured to the axial ends of the ceramic monolith 120 with a bonding agent 136 that forms a fluid-tight seal between the segmented end cap 130, 132 and the ceramic monolith 120.

Referring to FIG. 2, a portion of the monolith assembly 110 is depicted. The ceramic monolith 120 includes an array of parallel channels 122 that are separated by porous channel walls 124. The porous channel walls 124 extend along an axial length of the ceramic monolith 120. The porous channel walls 124 allow a fluid to permeate through the porous channel walls 124 between adjacent parallel channels 122. A plurality of the porous channel walls 124 are coated with a functional membrane 126. The functional membrane 126 is permeable to some portions of the fluid stream and impermeable to others. By passing a fluid 90 through the monolith assembly 110, the functional membrane 126 separates the fluid into a retentate portion 90B that flows through the plurality of parallel channels 122, and a permeate portion 90A that passes through the coated porous channel walls 124A.

In some embodiments, the porous channel walls 124 are coated with an inorganic coating layer 127 that is an applied intermediate layer that improves bonding performance of the functional membrane 126 to the porous channel walls 124. Examples include the inorganic membrane disclosed in U.S. Pat. Pub. No. 2008/0035557 and similar membranes.

In embodiments, the functional membrane 126 comprises an epoxide and a polyetheramine chosen from the group consisting of Poly(propylene glycol)bis(2-aminopropyl ether)s with Mn ranging from about 230 to about 4000 and Poly(propylene glycol)-block-(ethylene glycol)-block-poly (propylene glycol)bis(2-aminopropyl ether)s with Mn about 600. Examples of the functional membrane 126 may include Diepoxy-n-octane-Poly(propyleneglycol)bis(2-aminopropylether) (MW400), (DENO-D400), a crosslinked organic organic polymeric material. In one example, when solidified on a porous medium, DENO-D400 allows for a fluid stream, such as liquid and vaporized fuel having high RON (for example, the portion of the fuel having a RON greater than about 100) to preferentially pass through the solidified polymer and the porous medium, while limiting liquid and vaporized fuel having a low RON from passing through the solidified polymer and the porous medium. Thus, the functional membrane 126 separates a stream of fuel into a retentate portion having a low RON and a permeate portion having a high RON. While one example of a functional membrane 126 is DENO-D400, it should be understood that other functional membranes could be used such as polyester polyimide, for example as described in U.S. Pat. No. 5,550,199, and other polyether-epoxyamines, for example as described in U.S. Pat. No. 8,119,006 and U.S. Pat. Application 61/476,988.

The permeation of the functional membrane 126 coated onto the porous channel walls 124 may vary based on the temperature of the fluid introduced to the parallel channels 122. In general, as the temperature of the fluid increases, the permeation rate of the functional membrane 126 increases. However, as the permeation rate of the functional membrane 126 increases, the average RON of the permeate portion of a fluid stream will vary. An optimal operational setpoint can be achieved which balances the average RON versus the permeation rate. A fluid stream introduced to the pervaporation element 100 from about 60 to about 200 degrees C. at a pressure from about 200 to about 1000 kPa, and preferably from about 120 to about 160 degrees C. at a pressure from about 400 to about 600 kPa, can provide a useful amount of the permeate portion of the fuel with a RON of greater than 95 and preferably greater than about 100 from most market gasolines.

As illustrated in FIGS. 2 and 3, some porous channel walls 124A of the ceramic monolith 120 are coated by the functional membrane 126, while other porous channel walls 124B of the ceramic monolith are not coated with the functional membrane 126. As depicted in FIG. 2, the porous channel walls 124 positioned behind solid portions of the segmented end cap 130 are left uncoated by the functional membrane 126, while the porous channel walls 124 positioned behind the openings 134 of the segmented end cap 130 are coated by the functional membrane 126.

Referring to FIG. 3, one example of a layout of the location of coated porous channel walls 124A and uncoated porous channel walls 124B is schematically depicted. The coated porous channel walls 124A define a plurality of discrete through segments 128, depicted as the porous channel walls 124 and the parallel channels 122 contacting or inside of the nominal boundary 129. Each of the discrete through segments 128 are separated from one another by a plurality of uncoated porous channel walls 124B, depicted as the porous channel walls 124 wholly outside of the nominal boundary 129. In some embodiments, a plurality of uncoated porous channel walls 124B are located along the skin 125 of the ceramic monolith 120. The uncoated porous channel walls 124B positioned along the characteristic perimeter 125 allow for the permeate portion of the fluid to flow radially outwards through the skin 125 and be captured by the housing assembly 140 and drained to the permeate outlet port 146 (FIG. 1).

In the embodiments described herein the functional membrane 126 may be coated onto to the porous channel walls 124 using a variety of application methods. The functional membrane may be applied to the ceramic monolith 120 as described in U.S. Pat Pub. 2008/0035557 A1 or alternative by slip coating techniques as described in U.S. Pat. Application 61/476,988. The functional membrane may be applied to the ceramic monolith 120 as a fluid emulsion coating. The fluid emulsion coating may be introduced to the ceramic monolith 120 by at least partially submerging the ceramic monolith 120 into a "bath" of fluid emulsion. The fluid emulsion is then cured to solidify the functional membrane 126 around the porous channel walls 124. This fluid emulsion coating may be combined with other coating processes such as fluid slip coating.

In another embodiment, the functional membrane 126 may be applied through a "fogging" process, where droplets of the uncured pervaporation polymeric material that forms the functional membrane are sprayed into the air to form an aerosol. The ceramic monolith 120 is introduced to aerosolized pervaporation polymeric material and the droplets form a condensate on the porous channel walls 124. The condensate is then cured to solidify the functional membrane 126 around the porous channel walls 124.

The parallel channels 122 that are surrounded by uncoated porous channel walls 124B are masked prior to the application of the pervaporation polymeric material to the ceramic monolith 120. In some embodiments, the segmented end cap 130 masks the uncoated porous channel walls 124B from being coated by the pervaporation polymeric material. In other embodiments, a blocking plate masks the uncoated porous channel walls 124B from being coated by the pervaporation polymeric material. This blocking plate may be a consumable item or intrinsic to the apparatus used to coated the substrate.

The pervaporation polymeric material that solidifies to form the functional membrane 126 is applied to the porous channels walls 124 at a thickness from about 1 to about 10 microns. For example, in some embodiments, the functional membrane 126 has a thickness from about 2 to about 9 microns. In addition, for porous channel walls 124 that include the inorganic coating layer 127 applied intermediately between the porous channel walls 124 and the functional membrane 126, the inorganic coating layer is applied at a thickness up to about 5 microns. The inorganic coating layer 127 generally decreases permeability of the porous channel walls 124.

In embodiments where the ceramic monolith 120 is used for fuel separation, the ceramic monolith 120, the functional membrane 126, and the inorganic coating layer 127, if any, are resistant to chemical attack from any fuels that are introduced to the pervaporation element 100. Gasoline is a complex mixture of aromatic and aliphatic hydrocarbons having a wide boiling range, and may include a variety of constituents and additives, including, but not limited to, antioxidants, metal deactivators, detergents, dyes, methyl tert-butyl ether, ethyl tert-butyl ether, methanol, ethanol, n-butanol, tetraethyl lead, and methylcyclopentadienyl manganese tricarbonyl. In addition, components of the pervaporation element 100 that may come into contact with fuel are made from materials that are resistant to chemical attack from fuels introduced to the pervaporation element 100. For example, the housing assembly 140 may be made from a stainless steel. The face seal 160 may be made from Viton® fluoroelastomer.

Referring to FIG. 4, other patterns of coated porous channel walls 124A and uncoated porous channel walls 124B are contemplated for the ceramic monolith 120 for example, as depicted in FIG. 4, by varying the pattern of coated porous channel walls 124A and uncoated porous channel walls 124B, the number of discrete through segments 128 can be modified.

Referring again to FIGS. 1-3, in general, fluid is introduced as a liquid and/or a vapor to the coated porous channel walls 124A of one of the discrete through segments 128. In one embodiment, the fluid is a fuel, for example gasoline. As fuel flows through the ceramic monolith 120, the portion of the fuel having a high RON component preferentially pervaporates through the coated porous channel walls 124A and into the uncoated porous channel walls 124B. Because the uncoated porous channel walls 124B have an increased permeability as compared to the coated porous channel walls 124A, the portion of the fuel having a high RON flowing through the uncoated porous channel walls 124B can flow radially out of the monolith assembly 110 and into the housing assembly 140. The portion of fuel with enriched RON is collected at the permeate outlet port 146, where the portion of fuel exits the pervaporation element 100.

In contrast, because the functional membrane 126 preferentially reduces the portion of the fuel having a low RON from permeating through the coated porous channel walls 124A, the low RON components of the fuel only flow through the ceramic monolith 120 along the axial length of the parallel channels 122 in the discrete through segments 128. The portion of the fuel having a low RON remains inside the plurality of parallel channels 122 within the discrete through segments 128 over the axial length of the ceramic monolith 120 and is directed to a retentate outlet port 144, where the portion of fuel exits the pervaporation element 100.

When the partitioned monolith 120 is utilized in a fuel separation device, the yield of the fuel separation device decreases over time. The yield of a fuel separation device incorporating a functional membrane 126 is negatively affected by fouling of the membrane by the high boiling aromatic and additive species constituents of the fuel. To increase the yield of high RON fuel provided over an extended duration, the pervaporation element 100 of the present disclosure includes a plurality of discrete through segments 128 through the ceramic monolith 120. Fuel is directed through a single discrete through segment 128 until the yield of high RON fuel separation from that discrete through segment 128 falls below a threshold. Once the yield from a first discrete through segment 128 falls below the threshold, the discrete through segment 128 may be classified as performing at a suboptimal condition. Fuel is then directed away from the suboptimal-performing discrete through segment 128 and into a normal-performing discrete through segment 128, thereby providing the required yield of high RON fuel from the same monolith assembly 110. Thus, the duration of use of a single ceramic monolith 120 can be increased by segregating the ceramic monolith 120 into a plurality of discrete sections.

Figure 5:
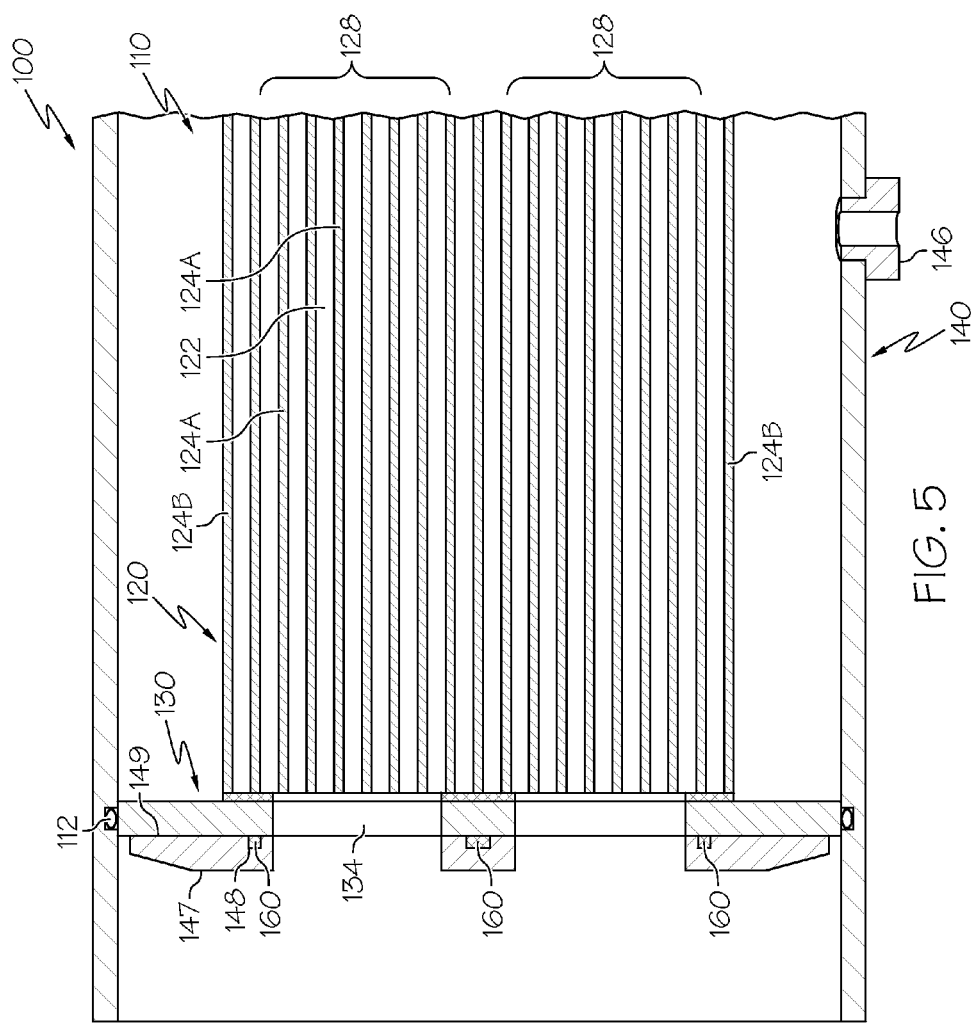
FIG. 5 graphically depicts a partial side sectional view of one embodiment of the pervaporation element having a partitioned ceramic monolith illustrated in FIG. 1 along line A-A.

Referring now to FIGS. 5 and 6, the monolith assembly 110 is positioned within the housing assembly 140 such that the pervaporation element 100 maintains a fluid-tight seal that prevents the permeate portion of the fluid from mixing with both the supplied and the retentate portion of the fluid. Circumferential O-rings 112 may be positioned between the monolith assembly 110 and the housing assembly 140, such that any of the permeate portion of the fluid that flows radially outwards from the ceramic monolith 120 is captured within the fluid-tight zone created by the interface between the monolith assembly 110 and the housing assembly 140. The permeate portion of fluid captured in the fluid-tight zone is directed out of the pervaporation element 100 at the permeate outlet port 146.

In the embodiment depicted in FIG. 5, the pervaporation element 100 includes a face seal 160 that contacts the monolith assembly 110 and creates a fluid-tight seal between a coupling ring 147 of the housing assembly 140 and the monolith assembly 110. The face seal 160 prevents fluid introduced into one of the discrete through segments 128 from entering another of the discrete through segments 128. As illustrated in FIG. 5, the face seal 160 contacts the upstream segmented end cap 130 and includes a plurality of windows 162 separated by wall portions 164. Referring to FIG. 6, some embodiments of the face seal 160 include a plurality of windows 162 that have a shape and size that generally correspond to the shape and size of the discrete through segments 128 of the ceramic monolith 120 (i.e., as depicted in FIG. 3). As illustrated in FIG. 5, the coupling ring 147 includes a seal gland 148 recessed into a contact face 149 of the coupling ring 147. The seal gland 148 has a shape and size that generally corresponds to the face seal 160 such that the face seal 160 is positioned inside the seal gland 148 when the monolith assembly 110 contacts the contact face 149 of the coupling ring 147. The seal gland 148 provides support to the face seal 160 to prevent the face seal 160 from coming out of contact with the monolith assembly 110 and therefore breaking the fluid-tight seal between the monolith assembly 110 and the coupling ring 147 of the housing assembly 140. While specific reference has been made hereinabove to the placement of the face seal 160 and the seal gland 148, it should be understood that the seal gland 148 may be positioned in a variety of components of the pervaporation element 100

Referring now to FIGS. 7A and 7B, alternative embodiments of face seals are schematically depicted. In these embodiments, the face seals 160 have a reduced number of windows 162 compared to the number of discrete through segments 128 in a corresponding monolith assembly 110. For example, FIG. 7A schematically depicts a face seal 160 having a single window 162. The wall portions 164 of the face seal 160 create a fluid-tight seal between the coupling ring 147 and the monolith assembly 110, and masks unused discrete through segments 128 of the monolith assembly 110 to prevent unwanted entry of fluid. Accordingly, it should be understood that the face seal 160 of FIG. 7A may be used to isolate a single through segment of a monolith assembly to which the face seal 160 is attached thereby limiting the entry of fluid into the monolith assembly to only the through segment exposed in the window 162 and masking the other through segments. FIG. 7B depicts a face seal 160 which comprises two windows 162 which isolate corresponding through segments of monolith assembly to which the face seal 160 is attached. In this embodiment, the face seal 160 only permits the entry of fluid into the through segments of the monolith assembly which are exposed in the windows 162 and prevents fluid entry into the through segments masked by the face seal 160.

While FIGS. 6, 7A and 7B depict seal masks with 4, 1, and 2 windows, respectively, it should be understood that the seal masks may be constructed with any number of windows to facilitate exposing and/or masking a desired number of through segments of a monolith assembly. Using the seal masks to control the flow of fluid into a specific number of through segments may be used to control the yield of the pervaporation element, the permeate/retentate separation rate of the pervaporation element, and the concentration of volatiles in the permeate and retentate portions of the separated fluid. For example, decreasing the number of exposed through segments from two (i.e., when using the seal mask of FIG. 7A) to one (i.e., when using the seal mask of FIG. 7B) decreases the permeate yield of the pervaporation element by half and also reduces the separation rate. However, the permeate may have lower concentrations of volatiles than permeate derived from a pervaporation element utilizing two through segments.

Other embodiments of the pervaporation element 100 include monolith assemblies 110 that exclude upstream and/or downstream segmented end caps 130, 132. In these embodiments, the ceramic monolith 120 includes patterns of coated porous channel walls 124A and uncoated porous channel walls 124B similar to those depicted in FIGS. 3 and 4, such that the coated porous channel walls 124A define discrete through segments 128 separated by a plurality of uncoated porous channel walls 124B. In these embodiments, however, the face seal 160 contacts the axial ends 121 of the ceramic monolith 120 directly, forming a fluid-tight seal that allows for fluid to be directed into one of the discrete through segments 128, while preventing fluid from being directed into the uncoated porous channel walls 124B.

Figure 8:
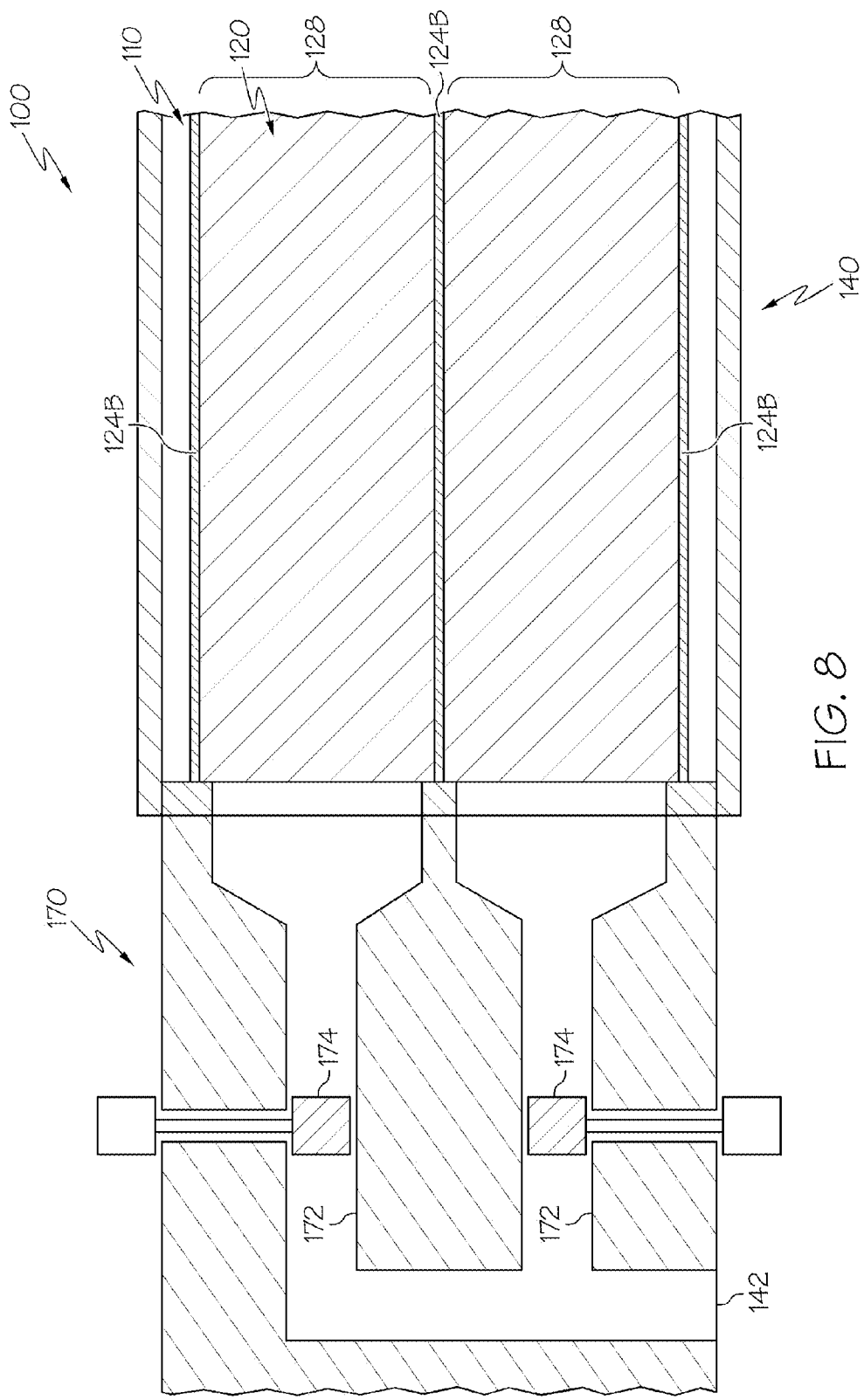
FIG. 8 graphically depicts a partial side sectional view of a pervaporation element having a partitioned ceramic monolith according to one or more embodiment shown and described herein.

Referring to FIG. 8, a selectable inlet plenum 170 of the pervaporation element 100 is depicted. The selectable inlet plenum 170 includes a plurality of fluid channels 172 that are positioned to direct fluid to one of the discrete through segments 128. Each of the fluid channels 172 includes a valve assembly 174 that can be selectively positioned to be open or closed. When the valve assembly 174 of one of the fluid channels 172 is open, the selectable inlet plenum 170 is in fluid communication with the discrete through segment 128 such that fluid introduced to the fluid inlet port 142 is directed along the fluid channel 172 and into the corresponding discrete through segment 128 of the monolith assembly 110. When the valve assembly 174 is closed, the selectable inlet plenum 170 is in fluid isolation with the discrete through segment 128 such that fluid introduced to the fluid inlet port 142 is diverted away from the discrete through segment 128 of the monolith assembly 110 corresponding to the closed valve assembly 174. Thus, the selectable inlet plenum is selectable to be in fluid communication or in fluid isolation with any of the corresponding discrete through segments 128 of the monolith assembly 110.

Figure 9:
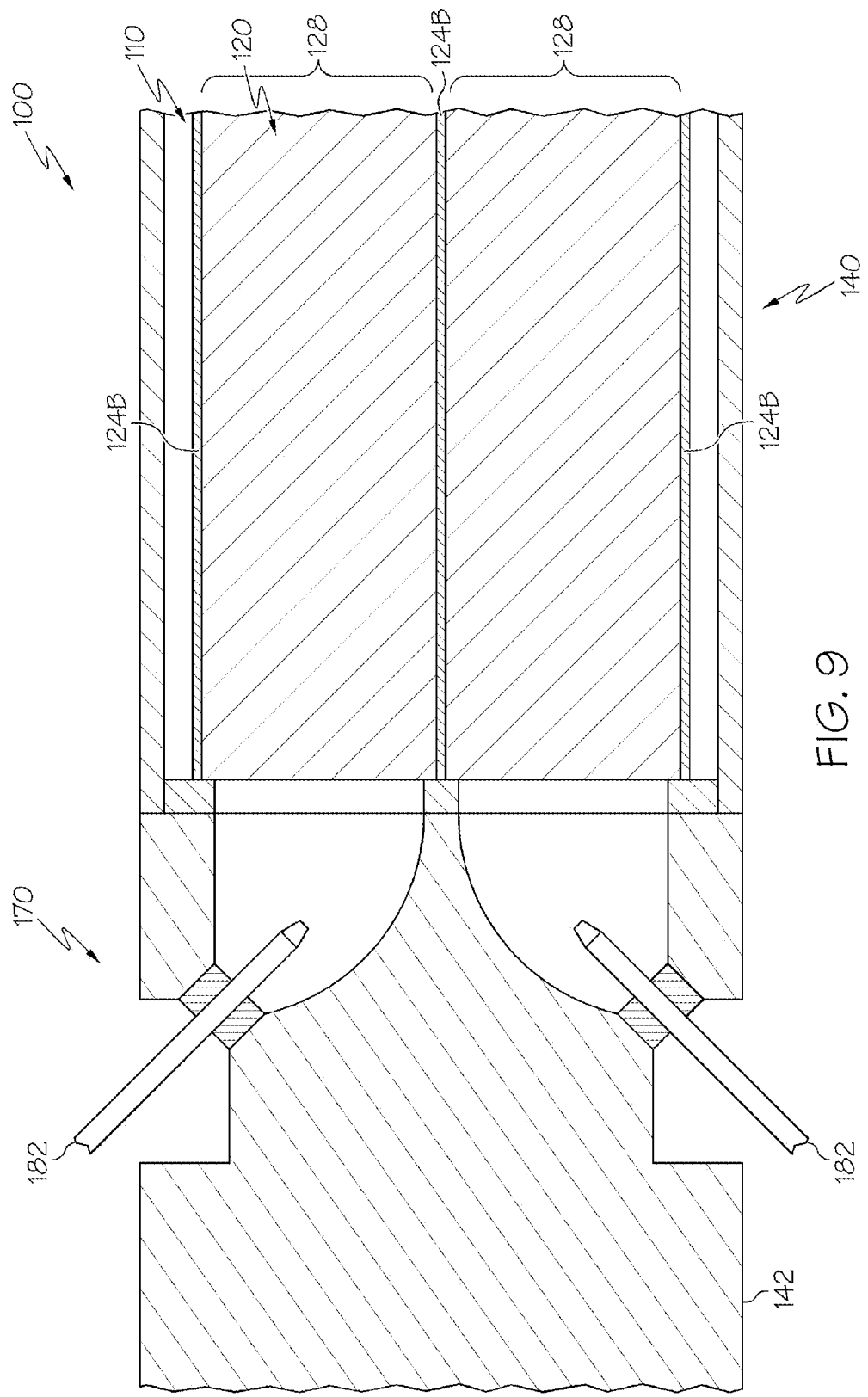
FIG. 9 graphically depicts a partial side sectional view of including a pervaporation element according to one or more embodiment shown and described herein.

Referring now to FIG. 9, another embodiment of a selectable inlet plenum 170 of the pervaporation element 100 that incorporates a plurality of injector bodies 182 is depicted. The monolith assembly 110 is positioned within the housing assembly 140 such that each injector body 182 is in fluid communication with one of the discrete through segments 128 of the monolith assembly 110. The injector bodies 182 are selectable to control a flow of fluid such that fluid is introduced to one of the discrete through segments 128 of the monolith assembly 110.

Figure 10:
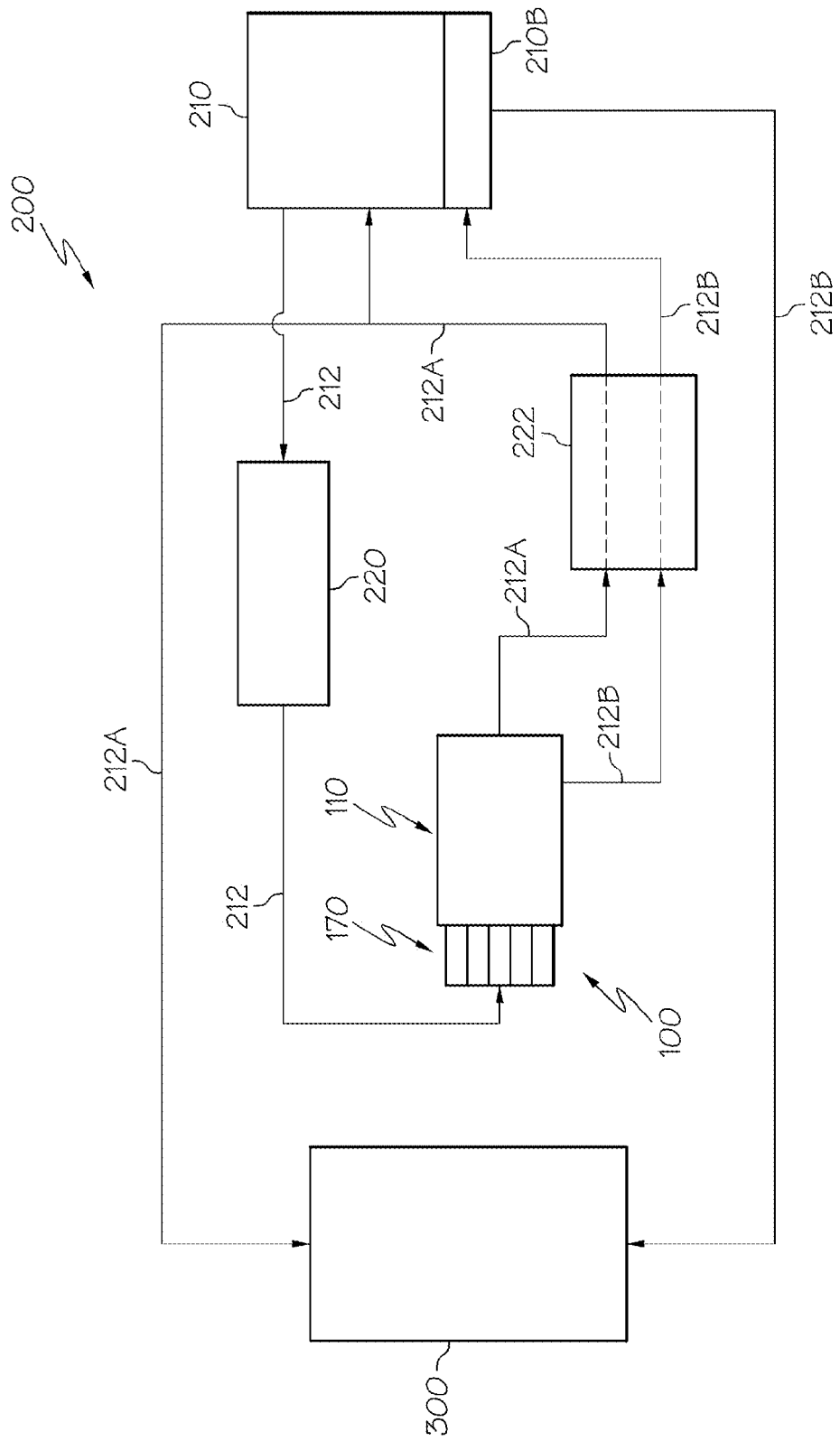
FIG. 10 schematically depicts an onboard fuel separator including a pervaporation element according to one or more embodiment shown and described herein.

As noted hereinabove, the pervaporation elements 100 described herein may be utilized in an onboard fuel separation unit in a vehicle. Referring to FIG. 10, a schematic of an onboard fuel separator 200 including the pervaporation element 100 is illustrated. Fuel is delivered through the onboard fuel separated 200 by a plurality of fuel lines 212. The fuel lines 212 place the connected components of the onboard fuel separator 200 in a fluid-tight configuration with one another. Fuel is deposited in a fuel tank 210 by an operator of a vehicle. Fuel is fed at an elevated pressure from the fuel tank 210 to a fuel heater 220, where the temperature of the fuel is increased. The heated fuel is then directed to the pervaporation element 100 where the fuel is introduced to the selectable inlet plenum 170 and directed into one of the discrete through segments 128 of the monolith assembly 110. As the fuel is fed through the monolith assembly 110, the fuel is split into a permeate portion having a high RON and a retentate portion having a low RON. Both the retentate portion and the permeate portion are directed to a fuel cooler 222 that cools the retentate portion and the permeate portion of the fuel, while maintaining separation between the two portions of the fuel stream. The retentate portion is fed through a retentate fuel line 212A and the permeate portion is fed through a permeate fuel line 212B. After being cooled, the retentate portion of the fuel stream is either directed back to the fuel tank 210 or directed to the engine 300. The permeate portion of the fuel stream is directed to a permeate holding volume 210B of the fuel tank 210, where the permeate portion is stored until demanded by the engine 300.

It should now be understood that ceramic monoliths coated with a functional membrane can be used to separate fluids into constituent components. Some of the porous channel walls are coated with the functional membrane. The functional membrane allows certain components of the fluid stream to permeate radially through the porous channel walls, while forcing other components to flow axially within the ceramic monolith. A plurality of regions of coated porous channel walls may be positioned within the ceramic monolith and spaced apart by a plurality of uncoated porous channel walls such that the regions are in fluid isolation relative to one another. Fluid can be introduced to the regions sequentially until the efficiency of separation of the fluid falls below a threshold level. Ceramic monoliths used to separate fluids can be used in a variety of applications including, but not limited to, separation of fluid by RON, solvent or water purification, and water/alcohol separation.

In a first aspect, the disclosure provides a pervaporation element comprising: a ceramic monolith having an array of parallel channels separated by porous channel walls extending along an axial length of the monolith; and a functional membrane coating a first plurality of the porous channel walls along the axial length of the monolith, the functional membrane functioning to separate a fluid into a retentate portion and a permeate portion, wherein: the porous channel walls coated by the functional membrane define a plurality of discrete through segments; each of the discrete through segments are separated from one another by a plurality of uncoated porous channel walls; and fluid entering the discrete through segments is separated into a retentate portion that exits in substantial portion through the discrete through segments and a permeate portion that exits the ceramic monolith radially outward through the uncoated porous channel walls and through a skin of the monolith.

In a second aspect, the disclosure provides an onboard fuel separator comprising a pervaporation element, a fuel heater, and a fuel cooler, wherein: the pervaporation element comprises a ceramic monolith having an array of parallel channels separated by porous channel walls running along a monolith length and a polymeric membrane coating a plurality of the porous channel walls along the monolith length; the polymeric membrane of the pervaporation element defines a plurality of discrete through segments comprised of a plurality of coated porous channel walls; and each of the discrete through segments of the pervaporation element is separated from one another by uncoated porous channel walls.

In a third aspect, the disclosure provides a ceramic monolith comprising: an array of parallel channels separated by porous channel walls extending along an axial length of the monolith; and a functional membrane coating a first plurality of the porous channel walls along the axial length of the monolith, the functional membrane functioning to separate a fluid into a retentate portion and a permeate portion, wherein: the porous channel walls coated by the functional membrane define a plurality of discrete through segments; each of the discrete through segments are separated from one another by a plurality of uncoated porous channel walls; and fluid entering the discrete through segments is separated into a retentate portion that exits in substantial portion through the discrete through segments and a permeate portion that exits the ceramic monolith radially outward through the uncoated porous channel walls and through a skin of the monolith.

In a fourth aspect, the disclosure provides the ceramic monolith of any of the first through third aspects, wherein uncoated porous channel walls are located on at least a portion of an outer perimeter of the ceramic monolith.

In a fifth aspect, the disclosure provides the pervaporation element of any of the first, second, or fourth aspects, further comprising a segmented end cap positioned at an axial end of the monolith, the segmented end cap having a plurality of openings positioned to expose the plurality of discrete through segments and cover the plurality of uncoated porous channel walls, wherein the segmented end cap directs the fluid to flow into the plurality of discrete through segments.

In a sixth aspect, the disclosure provides the pervaporation element of the fifth aspect, further comprising a face seal in contact with the segmented end cap, the face seal having a plurality of windows separated by fluid-tight wall portions, wherein the windows are positioned to expose a corresponding plurality of discreet through segments and fluid-tight wall portions maintain fluid isolation between the plurality of windows.

In a seventh aspect, the disclosure provides the pervaporation element of the sixth aspect, further comprising a coupling ring positioned adjacent to the segmented end cap, the coupling ring comprising a seal gland recessed into a contact face, the seal gland having a shape substantially similar to the face seal.

In an eighth aspect, the disclosure provides the pervaporation element of the fifth aspect, further comprising a face seal in contact with the segmented end cap, the face seal having at least one window corresponding to a discrete through segment of the monolith and fluid-tight wall portions isolating a remainder of the plurality of discrete through segments from the at least one window.

In a ninth aspect, the disclosure provides the pervaporation element of the eighth aspect, further comprising a coupling ring positioned adjacent to the segmented end cap, the coupling ring comprising a seal gland recessed into a contact face, the seal gland having a shape substantially similar to the face seal.

In an tenth aspect, the disclosure provides the pervaporation element of any of the first, second, or fourth through ninth aspects, further comprising a housing assembly in which the porous ceramic monolith is positioned, the housing assembly comprising: a fluid inlet port; a retentate fluid outlet port; and a permeate fluid outlet port.

In a eleventh aspect, the disclosure provides the pervaporation element of any of the first, second, or fourth through ninth aspects, further comprising a selectable inlet plenum, the selectable inlet plenum placing the fluid inlet port in fluid communication with a first discrete through segments.

In a twelfth aspect, the disclosure provides the pervaporation element of the eleventh aspect, wherein the selectable inlet plenum is selectable to place the fluid inlet port in fluid communication with a second discrete channel portion and place the fluid inlet port in fluid isolation with the first discrete channel portion.

In an thirteenth aspect, the disclosure provides the pervaporation element of the eleventh aspect, further comprising a selectable inlet plenum, the selectable inlet plenum placing the fluid inlet port in fluid isolation with one of the discrete through segments.

In a fourteenth aspect, the disclosure provides the pervaporation element of any of the first, second, or fourth through thirteenth aspects, further comprising a plurality of injector bodies, wherein each injector body is in fluid communication with at least one of the discrete through segments.

In a fifteenth aspect, the disclosure provides the ceramic monolith of any of the first through fourteenth aspects, wherein the porous channel walls are resistant to chemical attack from liquid and/or vapor phase gasoline.

In a sixteenth aspect, the disclosure provides the ceramic monolith of any of the first through fourteenth aspects, wherein the functional membrane comprises a polymeric material for separating liquid and vapor gasoline into constituent components.

In a seventeenth aspect, the disclosure provides the ceramic monolith of any of the first through fifteenth aspects, wherein the functional membrane comprises an organic coating for separating liquid and vapor gasoline into constituent components.

In an eighteenth aspect, the disclosure provides the ceramic monolith of any of the first through fifteenth or seventeenth aspects, wherein the functional membrane comprises DENO-D400.

In a nineteenth aspect, the disclosure provides the ceramic monolith of any of the first through eighteenth aspects, wherein the ceramic monolith comprises mullite.

In a twentieth aspect, the disclosure provides the ceramic monolith of any of the first through eighteenth aspects, wherein the ceramic monolith comprises cordierite.

In a twenty-first aspect, the disclosure provides the ceramic monolith of any of the first through eighteenth aspects, wherein the ceramic monolith comprises aluminum titanate.

In a twenty-second aspect, the disclosure provides the ceramic monolith of any of the first through twenty-first aspects, further comprising an inorganic coating layer coating a plurality of the porous channel walls along the monolith length, wherein the inorganic coating layer is dissipated between the porous channel walls and the functional membrane.

In a twenty-third aspect, the disclosure provides the ceramic monolith of any of the first through twenty-second aspects, wherein the ceramic monolith has a porosity of 35%.

In a twenty-fourth aspect, the disclosure provides the onboard fuel separator of the second aspect, wherein the fuel heater and the fuel cooler are in fluid communication with the pervaporation element and are located upstream and downstream, respectively, of the pervaporation element.

In a twenty-fifth aspect, the disclosure provides the onboard fuel separator of any of the second or twenty-fourth aspects, wherein the pervaporation element further comprises a selectable inlet plenum, and the selectable inlet plenum directs fuel flow into one of the discrete through segments.

In a twenty-sixth aspect, the disclosure provides a method of manufacturing a pervaporation element comprising: extruding a ceramic monolith comprising an array of parallel channels separated by porous channel walls running along a monolith length; masking a plurality of the porous channel walls; and applying a pervaporation polymeric material to a plurality of porous channels walls that are unmasked.

In a twenty-seventh aspect, the disclosure provides the method of the twenty-sixth aspect, wherein the pervaporation polymeric material is applied as a fluid coating.

In a twenty-eighth aspect, the disclosure provides the method of any of the twenty-sixth or twenty-seventh aspects, wherein the pervaporation polymeric material is applied as an aerosol.

In a twenty-ninth aspect, the disclosure provides the method of any of the twenty-sixth through twenty-eighth aspects, further comprising applying an inorganic coating layer to the plurality of porous channel walls.

In a thirtieth aspect, the disclosure provides the method of any of the twenty-sixth through twenty-ninth aspects, further comprising: inserting the ceramic monolith into a housing assembly; and inserting a sealing member into the housing assembly keeping a plurality of discrete through segments defined by porous channel walls coated by the pervaporation polymeric material separated from one another by uncoated porous channel walls in fluid isolation from one another.

In a thirty-first aspect, the disclosure provides a method of separating high RON fuel from low RON fuel, comprising: introducing fuel having a high RON portion and a low RON portion to a pervaporation element, the pervaporation element comprising a ceramic monolith having an array of parallel channels separated by porous channel walls and a functional membrane coating a plurality of the porous channel walls, where the porous channel walls coated by the functional membrane define a plurality of discrete through segments, and each of the discrete through segments is separated from one another by a plurality of uncoated porous channel walls; flowing the fuel through one or more of the plurality of discrete through segments of the pervaporation element such that retentate portion of the fuel having a low RON flows along the discrete through segment or segments and the permeate fuel having a high RON flows through the coated porous channel walls and the uncoated porous channel walls; and directing the fuel away from other of the plurality of discrete through segments of the pervaporation element.

In a thirty-second aspect, the disclosure provides the method of the thirty-first aspect further comprising: heating the fuel having a high RON portion and a low RON portion; and cooling the retentate portion of the fuel and the permeate portion of the fuel.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

EXAMPLES

Example 1

Synthesis of DENO-D400 Pre-Polymer

An aliphatic epoxy-polyether amine crosslinked membrane polymer was made with near equivalent amounts, 47.0 g of 1,2,7,8-Diepoxy-n-octane, or DENO (Aldrich) and 63.0 g of 400 mw Polypropylene Glycol bis 2 aminopropyl ether, or D400 (Aldrich/Huntsman). These were combined with 12.0 g Benzyl alcohol catalyst and 331.2 g toluene in a 1000 ml reaction flask, equipped with condenser and stirrer (Eurostar PWR CV81) operated at 250 rpm, and reacted for 2 hours at 100° C. This mixture was allowed to cool to 60° C., while stirring and monitoring torque. The reaction was quenched by dilution with toluene to a final pre-polymer concentration of 25% when the torque increase corresponded to 54% conversion by nmr (torque reading=10). The final epoxy:NH ratio was 1.05. The product was refrigerated at 0° C. prior to use.

Example 2

Coating of Partitioned Monolith

A nominally 2.4" dia.×8" long porous Mullite monolith, having nominally 1.8 mm channel diameter, was coated with a series of microparticulate metal oxide slurries and calcined as described in U.S. Pat. Pub No. 2008/0035557 to obtain a porous substrate having a titania surface of nominal 0.01 micron porosity. The monolith was partitioned into quadrant segments by fastening and sealing end rings with a ceramic filled epoxy cement. Each quadrant segment had 82 channels, with a surface area of 0.087 $m^2$ and a total area of 0.348 $m^2$. The partitioned ceramic monolith was designated 2L2R-33M.

The 0.01 micron porosity partitioned monolith was coated with a DENO-D400 polymer precursor prepared as described in Example 1 and coated in a manner similar to that described in Provisional US Pat Application based on 2011EM006 Example 4. Several coatings (7) were required to obtain a leak free polymer film. The first two coatings were preceded by wetting of the surface with water against 15 kPa nitrogen back pressure, followed by draining and blowing out the channels and then filling the channels with the 12.5% pre-polymer solution in toluene. The additional coatings were made by diluting the pre-polymer solution as described in Table 1. A final DENO-D400 polymer weight of 2.31 g was obtained after curing at 150° C. for 12 hours. The monolith had an acceptable vacuum loss of 12 kPa over 10 minutes, from −92 kPa.

TABLE 1

Coating of Partitioned Monolith 2L2R-33M
2.4" × 8", Mullite, 0.01 μm inorg. layer, 1.8 mm chan. DIA, 82 channels/segment
All-slip coating, DENO/D400, Corning DENO-D400 Prepolymer in Toluene

| | | | |
|---|---|---|---|
| 1 | BP/H$_2$O/Slip | 12.5% Prepolymer | 1.31 g pulls to −52 kPa |
| 2 | BP/H$_2$O/Slip | 12.5% Prepolymer | 0.70 g pulls to −74 kPa |
| 3 | BP/Slip | 6.25% Prepolymer | 0.09 g pulls to −88 kPa |
| 4 | BP/Slip | 6.25% Prepolymer | 0.04 g pulls to −92 kPa |
| 5 | Vac/Slip | 3.125% Prepolymer | 0.02 g vac. loss: 18 kPa/10 min |
| 6 | Vac/Slip | 3.125% Prepolymer | 0.08 g vac. loss: 16 kPa/10 min |
| 7 | Vac/Slip | 3.125% Prepolymer | 0.07 g vac. loss: 12 kPa/10 min |
| | | Total polymer gain: | 2.31 g |

Example 3

Pervaporation Testing of Partitioned Monolith

The partitioned membrane monolith of Example 2 was evaluated for pervaporation performance using a model feed consisting of 45 wt % n-heptane, 45 wt % toluene and 10 wt % ethanol. Each segment of the partitioned membrane was tested separately by sealing off the unused sections. Test conditions of 0.5 g/s feed rate, 145° C. inlet temperature, 400 kPag and a permeate vacuum of about 20 kPa were used. The feed was introduced through a WL ½-90 Bete spray nozzle (Bete Fog Nozzles, Inc, Greenfield, Mass.) located to distribute the feed to the section used. All four segments were found to have similar flux behavior and nearly identical aromatic and ethanol selectivities when compared at the same yield.

TABLE 2

Model Feed Testing of 2L2R-33M Partitioned Membrane Monolith
Membrane: 2.13 g DENO-D400 Polymer on 0.348 m2 Corning 2L2R-33M Monolith
Conditions: E10MF 0.5 g/s, 145° C., 400 kPag, 20 kPa Permeate

| Segment # | 1 | 2 | 3 | 4 |
|---|---|---|---|---|
| Flux g/s-m2 | 2.3 | 2.0 | 2.5 | 2.0 |
| Permeate Yield, wt % | 40 | 35 | 43 | 34 |
| Aromatic Selectivity | 1.6 | 1.6 | 1.3 | 1.6 |
| Ethanol + Aromatic Selectivity | 2.1 | 2.2 | 1.8 | 2.1 |

Example 3

Gasoline Testing of Partitioned Monolith

Figure 11:
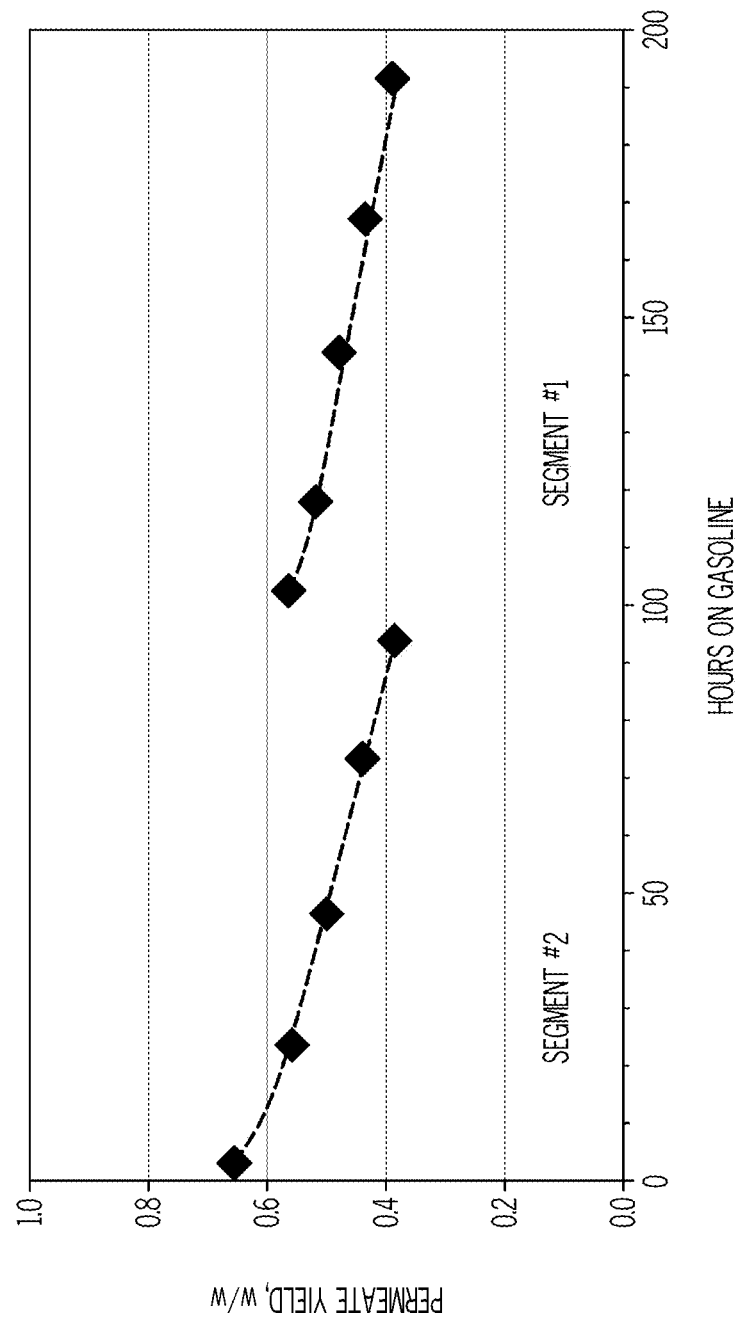
FIG. 11 illustrates the pervaporation performance for separating gasoline using separate segments of a partitioned element according to one or more embodiment shown and described herein.

The partitioned membrane monolith from Example 3 was evaluated for separation of gasoline into higher and lower octane fractions as described in U.S. Pat. No. 7,803,275 B2. The monolith was mounted vertically, with the inlet at the top of the housing and the retentate and permeate outlets at the low side. A regular grade 87 AKI (92.6 RON) US E10 gasoline was used as feed. Process conditions were established with a feed rate of 0.35 g/s at 400 kPag and about 155° C. inlet temperature. At these conditions about 80% of the gasoline feed is vaporized. The mixed phase feed was fed through a Bete WL½-90 spray nozzle (Bete Fog Nozzles, Inc, Greenfield, Mass.) to distribute the feed to the monolith channels of the segment selected. Unused sections were masked with a Viton face seal (160) at both ends of the monolith as described earlier and illustrated in FIGS. 6 and 7. The membrane module was insulated and operated adiabatically. A vacuum was maintained on the outer annulus of the membrane housing by means of a Fox 0.031" orifice mini-eductor pump (Fox Valve Development Corp., Dover, N.J.) using cooled permeate product supplied at 500 kPag to entrain the permeate vapor product at about 30 kPa. Samples of permeate and retentate were collected, weighed and analyzed by gas chromatography Segment #2 was tested first, followed by an inspection, and then a test of Segment #1. Each test lasted about 100 hours, over which time the yield decreased as shown in FIG. 11. During the test of Segment #2 the permeate yield decreased from 65% to 39%. Restarting the test on Segment #1 gave performance very similar to the first test with an initial permeate yield of 56% decreasing to 39%. The results indicate that the two segments effectively functioned similarly and independently of one another. Analyses of the products obtained at the end of each test confirm the similarity of performance for each segment as shown in Table 3. High octane ethanol was substantially concentrated in the permeate, with a corresponding reduction in low octane C6+ non aromatics.

TABLE 3

Gasoline Testing of 2L2R-33M Partitioned Membrane Monolith
Membrane: 2.13 g DENO-D400 Polymer on 0.348 m2 Corning 2L2R-33M Monolith
Conditions: E10 US RUL 0.35 g/s, 155° C., 400 kPag, 30 kPa Permeate

| Segment # | Feed | 1 | 2 | 3 | 4 |
|---|---|---|---|---|---|
| Time on Gasoline, hours total | | 192 | 94 | unused | unused |
| Time on Gasoline, hours/Segment | | 91 | 94 | | |
| Flux g/s-m2 | | 1.6 | 1.6 | | |
| Permeate Yield, wt % | 100 | 38.9 | 38.5 | | |
| Permeate Composition, wt % | | | | | |
| C3-C5 HC | 12.4 | 14.0 | 13.6 | | |
| C6+ Non Aromatics | 48.5 | 38.4 | 38.8 | | |
| Aromatics | 29.7 | 28.8 | 29.2 | | |
| Ethanol | 9.5 | 18.8 | 18.4 | | |

Figure 12C:
FIG. 12, provides images of partitioned element A) fresh, B) with one section used, and C) with two sections used for separating gasoline by pervaporation according to one or more embodiment shown and described herein.
Figure 12B:
Figure 12A:
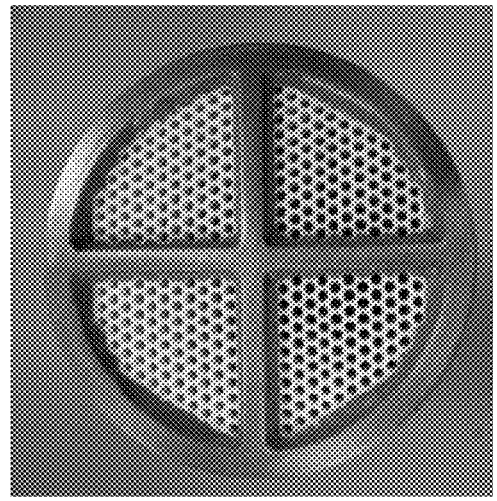

Inspections of the partitioned monolith after each test clearly indicate a darkening of the polymer coating for the section used by the gasoline feed, with the remaining unused segments remaining lighter in color. The inspection pictures are shown in FIGS. 12a (the unused partitioned membrane), 12b (after use of segment #2) and 12c (after use of both Segments #2 and #1). In all cases, the permeate product remained colorless, while the retentate product had a darker yellow color than the light yellow gasoline feed.

What is claimed is:

1. A pervaporation element comprising:
a ceramic monolith having an array of parallel channels separated by porous channel walls extending along an axial length of the monolith, wherein a plurality of the porous channel walls are uncoated porous channel walls;
a functional membrane coating a first plurality of the porous channel walls along the axial length of the monolith, the functional membrane functioning to separate a fluid into a retentate portion and a permeate portion, wherein the first plurality of porous channel walls coated by the functional membrane define a plurality of discrete through segments and wherein the uncoated porous channel walls separate each of the discrete through segments such that fluid entering the discrete through segments is separated into a retentate portion that exits through the discrete through segments and a permeate portion that exits the ceramic monolith radially outward through the uncoated porous channel walls and through a skin of the monolith; and
a segmented end cap secured to an axial end of the ceramic monolith, the segmented end cap having a plurality of openings positioned to expose the plurality of discrete through segments and cover the uncoated porous channel walls such that the segmented end cap directs the fluid to flow into the plurality of discrete through segments.

2. The pervaporation element of claim 1, wherein a plurality of the uncoated porous channel walls are located on at least a portion of an outer perimeter of the ceramic monolith.

3. The pervaporation element of claim 1, further comprising a face seal in contact with the segmented end cap, the face seal having a plurality of windows separated by fluid-tight wall portions, wherein the windows are positioned to expose a corresponding plurality of the discrete through segments and fluid-tight wall portions maintain fluid isolation between the plurality of windows.

4. The pervaporation element of claim 3 further comprising a coupling ring positioned adjacent to the segmented end cap, the coupling ring comprising a seal gland recessed into a contact face, wherein the face seal is positioned inside the seal gland.

5. The pervaporation element of claim 1, further comprising a face seal in contact with the segmented end cap, the face seal having at least one window corresponding to a discrete through segment of the monolith and fluid-tight wall portions isolating a remainder of the plurality of discrete through segments from the at least one window.

6. The pervaporation element of claim 5, further comprising a coupling ring positioned adjacent to the segmented end cap, the coupling ring comprising a seal gland recessed into a contact face, wherein the face seal is positioned inside the seal gland.

7. The pervaporation element of claim 1 further comprising a housing assembly in which the porous ceramic monolith is positioned, the housing assembly comprising:
   a fluid inlet port;
   a retentate fluid outlet port; and
   a permeate fluid outlet port.

8. The pervaporation element of claim 7, wherein the discrete through segments comprise a first discrete through segment, and the pervaporation element further comprises a selectable inlet plenum, the selectable inlet plenum placing the fluid inlet port in fluid communication with the first discrete through segment.

9. The pervaporation element of claim 7 further comprising a selectable inlet plenum, the selectable inlet plenum placing the fluid inlet port in fluid isolation with one of the discrete through segments.

10. The pervaporation element of claim 1 further comprising a plurality of injector bodies, wherein each injector body is in fluid communication with at least one of the discrete through segments.

11. The pervaporation element of claim 1, wherein the porous channel walls are resistant to chemical attack from liquid and/or vapor phase gasoline.

12. The pervaporation element of claim 1, wherein the functional membrane comprises a polymeric material for separating liquid and vapor gasoline into constituent components.

13. The pervaporation element of claim 1, wherein the functional membrane comprises an organic coating for separating liquid and vapor gasoline into constituent components.

14. The pervaporation element of claim 1, wherein the functional membrane comprises an epoxide and a polyetheramine chosen from the group consisting of Poly(propylene glycol)bis(2-aminopropyl ether)s with Mn ranging from about 230 to about 4000 and Poly(propylene glycol)-block-(ethylene glycol)-block-poly(propylene glycol)bis(2-aminopropyl ether)s with Mn about 600.

15. The pervaporation element of claim 1, wherein the ceramic monolith comprises mullite, cordierite, silicon carbide, or aluminum titanate.

16. The pervaporation element of claim 1 further comprising an inorganic coating layer coating a plurality of the porous channel walls along the monolith length, wherein the inorganic coating layer is positioned between the porous channel walls and the functional membrane.

17. The pervaporation element of claim 1, wherein the ceramic monolith has a porosity of at least 35%.

18. The pervaporation element of claim 1, further comprising a bonding agent securing the segmented end cap to the ceramic monolith.

* * * * *